Figure 1:
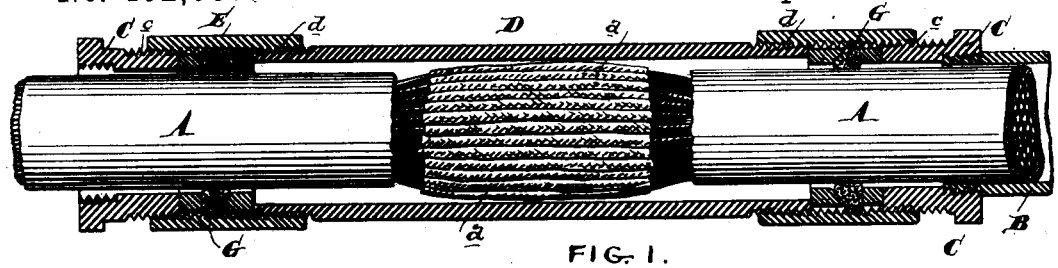

(No Model.)

T. J. DEWEES.
SPLICE BOX FOR ELECTRIC CABLES.

No. 402,007. Patented Apr. 23, 1889.

WITNESSES:
David G. Williams
Henry Drury

INVENTOR:
Thomas J. Dewees

UNITED STATES PATENT OFFICE.

THOMAS J. DEWEES, OF PALMYRA, NEW JERSEY, ASSIGNOR TO THE ELECTRIC CABLE CONSTRUCTION AND MAINTENANCE COMPANY, OF PENNSYLVANIA.

SPLICE-BOX FOR ELECTRIC CABLES.

SPECIFICATION forming part of Letters Patent No. 402,007, dated April 23, 1889.

Application filed February 23, 1889. Serial No. 300,809. (No model.)

*To all whom it may concern:*

Be it known that I, THOMAS J. DEWEES, of Palmyra, in the county of Burlington and State of New Jersey, have invented an Improvement in Splice-Boxes for Electric and other Cables, of which the following is a specification.

My invention relates to splice-boxes for cables of electric and other wires; and it consists of certain improvements, which are fully set out in the following specification and shown in the accompanying drawings.

My invention is primarily intended for underground cables of electric wires, though it may also be used for aerial cables, and is designed to form a protecting water-tight sheath or covering for that part of the cable where the splice or junction is formed, and thereby to prevent the possibility of the current being short-circuited at the splice by the moisture or water that may collect in the conduit. The apparatus by which this object is accomplished is shown in the drawings, in which—

Figure 2:
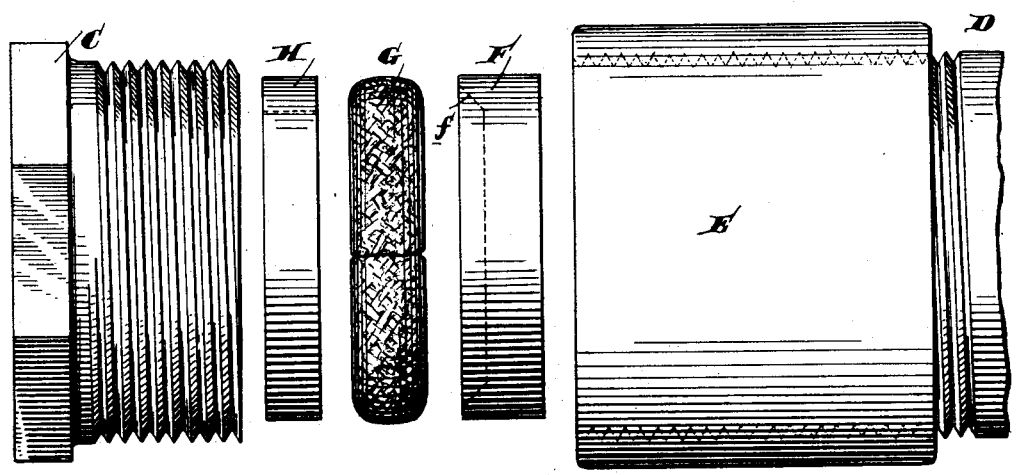
Figure 3:
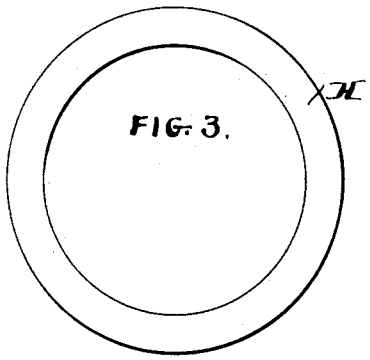
Figure 4:
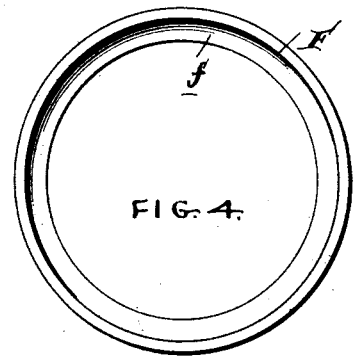

Figure 1 is a sectional view of my improved splice-box with the electric cable inclosed. Fig. 2 is a side elevation, on an enlarged scale, of the detached parts of my splice-box; and Figs. 3 and 4 are views of the rings which I employ for the purpose of forming the water-tight joint.

A is the electric cable, consisting of the insulated wires $a$, contained, preferably, in the metallic sheath.

B is the conduit-tube in which this cable is contained, having a hiatus or space at the point where the splice is made and at which the splice-box is located.

C are couplings screwed to the ends of the conduit and provided with screw-threads $c$.

D is a cylinder or box forming the sheath or protecting covering for the splice, provided with screw-threaded ends $d$.

E are screw-threaded collars by which the cylinder or box D is connected with the couplings C, forming socket portions on the ends of the cylinder or box. It is apparent that these collars may be made integral with the cylinder or box, if desired. The cylinder or box D is shorter than the distance between the couplings C, so that there is a space between each of the ends of the cylinder or box D and the couplings C.

F are metallic rings, preferably having one of their inner edges, $f$, beveled. These rings are placed about the cable A, with their flat or unbeveled edges against the ends of the cylinder D.

G are packing-rings or washers of soft material.

H are metallic rings having smooth and polished surfaces. The washers G are inserted between the rings H and F, the former of which are in contact with the couplings C and the latter with the ends of the cylinder or box. When the couplings are screwed up, they force the rings H against the washers G, preserving them upon the rings F and against the beveled edges thereof, which action forces the washers G closely against the cable A, forming a perfectly water-tight joint, with the section of the cable close to the part in which the splice is made.

The rings F and H are interposed between the washers and the couplings C and the box D, respectively, to prevent the tearing of the washers by the rough surfaces of the couplings and box when the latter are screwed into the collars E to force the washers down upon the cable; and I prefer to construct these rings F and H with smooth and polished surfaces, so that there will be as little friction as possible between them and the couplings and box; but it is apparent, however, that these rings F and H may be dispensed with, and the edges of the box or cylinder D may, if desired, be beveled and the ends of the couplings C made smooth or polished.

It is evident that the splice alone may be covered or inclosed, the rest of the cable relying on its armor to protect it. In this case the splice-box would be made water-tight at each end, as before.

While I prefer the construction shown, it is apparent that the details thereof may be varied without departing from the principles of my invention.

Having now described my invention, what I claim as new, and desire to secure by Letters Patent, is—

1. The combination of a cable of electric wires having a spliced joint, a sheath or box inclosing said splice and having packing-receiving sockets at each end, soft packing-rings in said socket portions, and couplings screwed into said socket portions and compressing the washer upon the cable.

2. The combination, with the spliced cable, of a protecting metal sheath or cylinder adapted to cover the spliced portion of said cable, washers of soft material surrounding said cable on each side of the splice, and means, substantially as described, to force said washers in contact with the cable to form a water-tight section.

3. The combination, with the spliced cable and an inclosing metal tube inclosing said cable, of a protecting metal sheath or box adapted to cover the spliced portion of said cable, couplings encircling said cable at each end of said sheath or box and uniting the tube and sheath or box, and washers of soft material between said coupling ends and the ends of the sheath or box, whereby, when said parts are drawn together, the washers are forced against the cable and make a tight joint.

4. The combination, with the spliced cable, of a protecting sheath or box adapted to cover the spliced portion of said cable, having screw-threaded ends, couplings encircling said cable at each end of said sheath or box and provided with screw-threads upon their outer surfaces to screw into the sheath or box, and washers of soft material between said couplings and the ends of the sheath or box, whereby, when said parts are screwed together, they force the washers against the cable.

5. The combination of the cable A, having the spliced portion, the box or sheath D, having projecting parts or collars E, couplings C, screwing into the projecting parts or collars, metallic rings F, having inner beveled edges, f, arranged within the projecting parts, and washers G, adapted to be compressed within the projecting parts or collars to make tight joints at each end of the splice-box.

6. The combination of a spliced cable, an inclosing metal splice-box having its edges beveled and provided with an internally-screw-threaded part projecting beyond the beveled edges, soft washers or packing-rings within said projecting parts, and couplings which screw into the projecting part of the splice-box and compress the washers.

7. The combination of a cable of electric wires having a spliced joint, a sheath or box inclosing said splice and having packing-receiving sockets at each end, soft packing-rings in said socket portions, packing-receiving metallic rings upon each side of the packing, and couplings screwed into said socket portions and compressing the washer upon the cable.

8. The combination of the sheath or box D, having its ends provided with collars E, forming socket portions at each end, annular rings H and F within said socket portion, a soft washer, G, between the annular rings, and couplings C, screwed into said socket portions to compress the rings H upon the washer.

9. The combination of the sheath or box D, having its ends provided with collars E, forming socket portions at each end, annular rings H and F within said socket portions, a soft washer, G, between the annular rings, couplings C, screwed into said socket portions to compress the rings H upon the washer, and the conduit-pipe B, screwed into the couplings, substantially as set out.

In testimony of which invention I hereunto set my hand.

THOS. J. DEWEES.

Witnesses:
ERNEST HOWARD HUNTER,
E. M. BRECKINREED.